US012630180B2

(12) United States Patent
Choi et al.

(10) Patent No.: US 12,630,180 B2
(45) Date of Patent: May 19, 2026

(54) DEVICE AND METHOD FOR CONTROLLING AUTONOMOUS DRIVING

(71) Applicants:Hyundai Motor Company, Seoul (KR); Kia Corporation, Seoul (KR)

(72) Inventors: Su Young Choi, Seoul (KR); Hae Ryong Lee, Seoul (KR); Sung Hyun Joe, Hanam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 154 days.

(21) Appl. No.: 18/514,653

(22) Filed: Nov. 20, 2023

(65) Prior Publication Data

US 2024/0383496 A1 Nov. 21, 2024

(30) Foreign Application Priority Data

May 15, 2023 (KR) ........................ 10-2023-0062640

(51) Int. Cl.
B60W 60/00 (2020.01)
B60W 40/10 (2012.01)

(52) U.S. Cl.
CPC .......... B60W 60/001 (2020.02); B60W 40/10 (2013.01); B60W 2552/30 (2020.02); B60W 2556/40 (2020.02); B60W 2720/24 (2013.01)

(58) Field of Classification Search
CPC ............... B60W 60/001; B60W 40/10; B60W 2552/30; B60W 2556/40; B60W 2720/24; B60W 60/0013; B60W 30/18145; B60W 50/0098; B60W 2520/06; B60W 60/0011; B60W 2050/0083
See application file for complete search history.

(56) References Cited

U.S. PATENT DOCUMENTS

| | | | |
|---|---|---|---|
| 2017/0329330 A1* | 11/2017 | Hatano | B60W 60/0051 |
| 2020/0124424 A1* | 4/2020 | Shibahata | B60W 10/04 |
| 2021/0402992 A1* | 12/2021 | Morimoto | B60W 30/12 |
| 2021/0403032 A1* | 12/2021 | Jing | G05D 1/226 |
| 2022/0089180 A1* | 3/2022 | Kim | B60W 30/18145 |
| 2022/0176995 A1* | 6/2022 | Subramanian | B60W 30/08 |
| 2022/0242420 A1* | 8/2022 | Morishima | B60W 40/09 |
| 2022/0250619 A1* | 8/2022 | Ikeda | B60W 30/12 |
| 2023/0150508 A1* | 5/2023 | Nimura | G08G 1/096844 701/41 |
| 2024/0067214 A1* | 2/2024 | Nagasaka | G01C 21/3492 |
| 2024/0308543 A1* | 9/2024 | Mizoguchi | B60W 60/001 |

* cited by examiner

*Primary Examiner* — Fadey S. Jabr
*Assistant Examiner* — Michael J Herrera
(74) *Attorney, Agent, or Firm* — Banner & Witcoff, Ltd.

(57) ABSTRACT

The present disclosure relates to a device and a method for controlling autonomous driving. The device may include a processor, and a memory storing instructions, when executed by the processor, may cause the device to create a driving route based on a map, determine, based on an amount of change in a heading angle of the driving route, a curved section, change the driving route to reduce the amount of change in the heading angle, and control autonomous driving of a vehicle along the changed driving route.

20 Claims, 10 Drawing Sheets

LOCATION
INFORMATION

PRECISE
MAP

AUTONOMOUS DRIVING CONTROL DEVICE
100

SENSOR
10

COMMUNICATION DEVICE
110

PROCESSOR
120

DRIVING CONTROLLER
140

MEMORY
130

1

DEVICE AND METHOD FOR CONTROLLING AUTONOMOUS DRIVING

CROSS-REFERENCE TO RELATED APPLICATION

This application claims the benefit of priority to Korean Patent Application No. 10-2023-0062640, filed in the Korean Intellectual Property Office on May 15, 2023, the entire contents of which are incorporated herein by reference.

TECHNICAL FIELD

The present disclosure relates to a device and a method for controlling autonomous driving, and more particularly, to a technology for flexibly creating a driving route.

BACKGROUND

To enhance a convenience of a driver, a development of autonomous vehicles is conducted. The autonomous vehicles may be classified into levels based on a degree of intervention of the driver, and may be developed to a level at which unmanned driving may be possible without any intervention of the driver.

Autonomous driving systems may be classified into levels based on classification criteria of the International; Society of Automotive Engineers. An autonomous driving step of level 4 may create a global route and a local route in advance based on a precise map, and perform autonomous driving using the routes created in advance. The route of the autonomous driving system may be set in a direction of refraining a lane change to reduce a traffic flow and safety accidents.

Because a scheme of setting an autonomous driving route may not consider a passenger as such, there may be a limit in improving a ride comfort of the passenger in an autonomous driving process.

In addition or alternative, because the driving route may not be able to be flexibly set, a case in which the lane changes in a hurry may occur.

SUMMARY

According to the present disclosure, a device for controlling autonomous driving, the device may comprise: a processor; and a memory storing instructions, when executed by the processor, may cause the device to: create a driving route based on a map; determine, based on an amount of change in a heading angle of the driving route, a curved section; change the driving route to reduce the amount of change in the heading angle; and control autonomous driving of a vehicle along the changed driving route.

The device, wherein the instructions, when executed by the processor, may cause the device to select a driving lane link of a plurality of lane links, wherein each driving lane link matches, based on a location of the vehicle, one-on-one with a line.

The device, wherein the instructions, when executed by the processor, may cause the device to: select a new lane link among outer lane links of the driving lane link; and connect the selected new lane link with the driving lane link.

The device, wherein the instructions, when executed by the processor, may cause the device to: calculate an amount of change in the heading angle for each unit length at each of a plurality of points along the driving lane link; detect a start point having an amount of change in the heading angle for each unit length equal to or greater than a first critical angle among the plurality of points; detect an end point having an amount of change in the heading angle for each unit length equal to or smaller than a second critical angle among the plurality of points after the start point; and determine a section between the start point and the end point as the curved section.

The device, wherein the instructions, when executed by the processor, may cause the device to: calculate a change rate of the amount of change in the heading angle for each unit length at each of the plurality of points; and change the driving route by connecting the driving lane link with a new lane link at a change point with the greatest change rate of the amount of change in the heading angle for each unit length.

The device, wherein the instructions, when executed by the processor, may cause the device to: calculate an average amount of change in the heading angle for each unit length from the start point to the change point; adjust the driving lane link such that the amount of change in the heading angle for each unit length at the change point becomes a magnitude of the average amount of change in the heading angle; and change the driving route by connecting a driving lane link closest to the adjusted driving lane link with the change point.

The device, wherein the instructions, when executed by the processor, may cause the device to change the driving lane link into a Bézier curve shape connecting a start point of a curved section in the driving lane link with an end point of a curved section in the selected new lane link.

The device, wherein the instructions, when executed by the processor, may cause the device to: determine that a distance from a point entering a straight section to a destination is equal to or smaller than a critical distance after passing through an intersection; and based on the distance from the point entering the straight section to the destination being equal to or smaller than the critical distance, determine a section, of the driving lane link from a point entering the intersection to the destination, as the curved section.

The device, wherein the instructions, when executed by the processor, may cause the device to change the driving lane link within the intersection to enter a line closest to the destination.

The device, wherein the instructions, when executed by the processor, may cause the device to: detect an adjacent curved section of a line adjacent to the driving route; and change the driving route in an opposite direction of where the adjacent curved section is located.

According to the present disclosure, a method for controlling autonomous driving, the method may comprise: creating, by a processor, a driving route based on a map for guiding the autonomous driving, and determining, based on an amount of change in a heading angle of the driving route, a curved section; changing the driving route to reduce the amount of change in the heading angle; and controlling autonomous driving of a vehicle along the changed driving route.

The method, wherein the creating the driving route may include: selecting a driving lane link of a plurality of lane links, wherein each driving lane link matches, based on a location of the vehicle, one-on-one with a line.

The method, wherein the changing the driving route may include: selecting a new lane link among outer lane links of the driving lane link; and connecting the selected new lane link with the driving lane link.

The method, wherein the determining the curved section may include: calculating an amount of change in the heading angle for each unit length at each of a plurality of points determining a shape of the driving lane link; detecting a start point having an amount of change in the heading angle for each unit length equal to or greater than a first critical angle among the plurality of points; detecting an end point having an amount of change in the heading angle for each unit length equal to or smaller than a second critical angle among the plurality of points after the start point; and determining a section between the start point and the end point as the curved section.

The method, wherein the changing the driving route may include: calculating a change rate of the amount of change in the heading angle for each unit length at each of the plurality of points; and connecting the driving lane link with a new lane link at a change point with the greatest change rate of the amount of change in the heading angle for each unit length.

The method, wherein the changing the driving route may include: calculating an average amount of change in the heading angle for each unit length from the start point to the change point; and adjusting the driving lane link such that the amount of change in the heading angle for each unit length at the change point becomes a magnitude of the average amount of change in the heading angle; and connecting a driving lane link closest to the adjusted driving lane link with the change point.

The method, wherein the changing the driving route may include: changing the driving lane link into a Bézier curve shape connecting a start point of a curved section in the driving lane link with an end point of a curved section in the selected new lane link.

The method, wherein the determining the curved section may include: determining that a distance from a point entering a straight section to a destination is equal to or smaller than a critical distance after passing through an intersection; and based on the determining, determining a section, of the driving lane link from a point entering the intersection to the destination, as the curved section.

The method, wherein the changing the driving route may include: changing the driving lane link within the intersection to enter a line closest to the destination.

The method, further may comprise: detecting an adjacent curved section of a line adjacent to the driving route; and changing the driving route in an opposite direction of where the adjacent curved section is located.

BRIEF DESCRIPTION OF THE DRAWINGS

The above and other objects, features and advantages of the present disclosure will be more apparent from the following detailed description taken in conjunction with the accompanying drawings.

4

Figure 6:
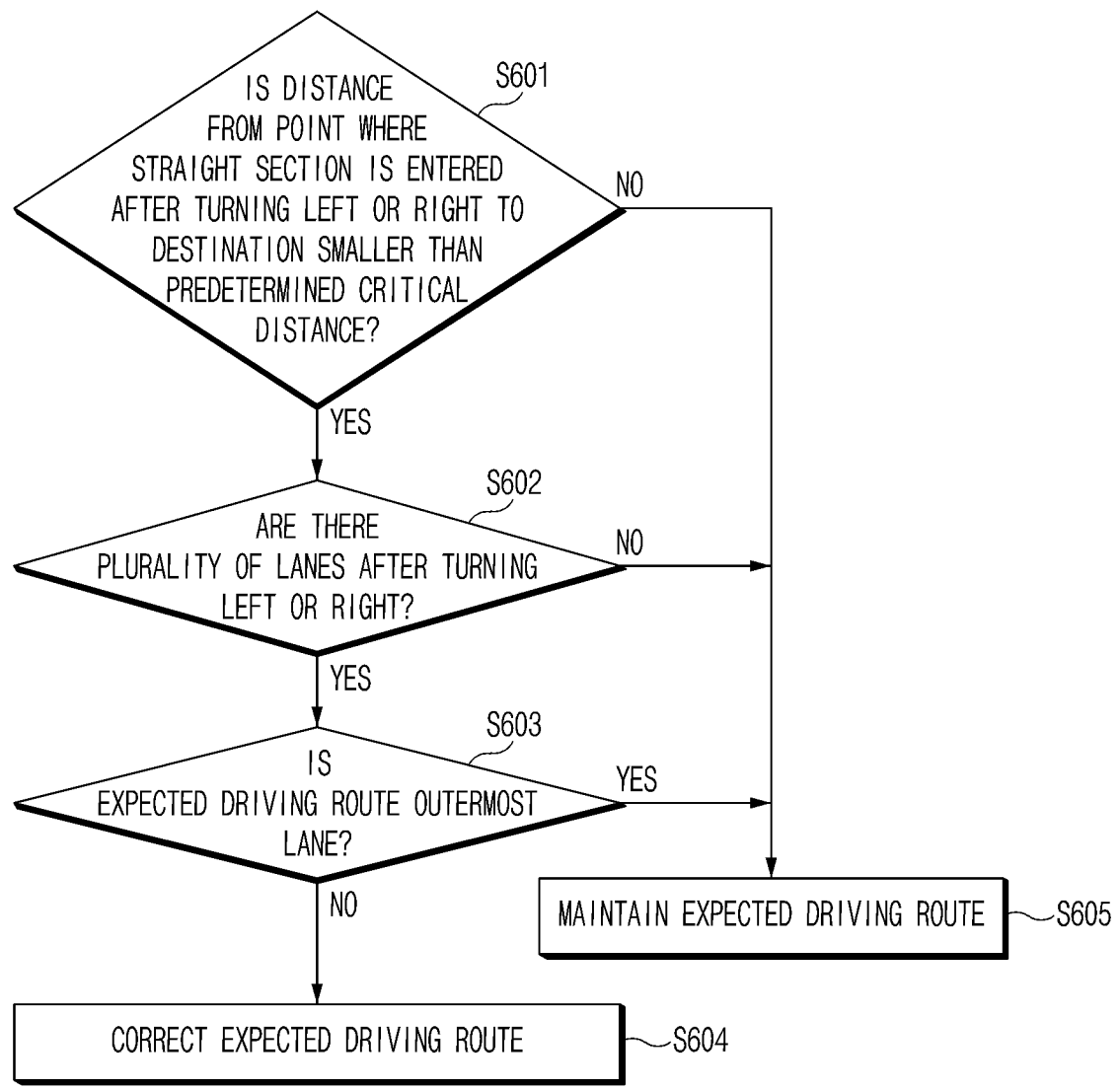
Figure 7:
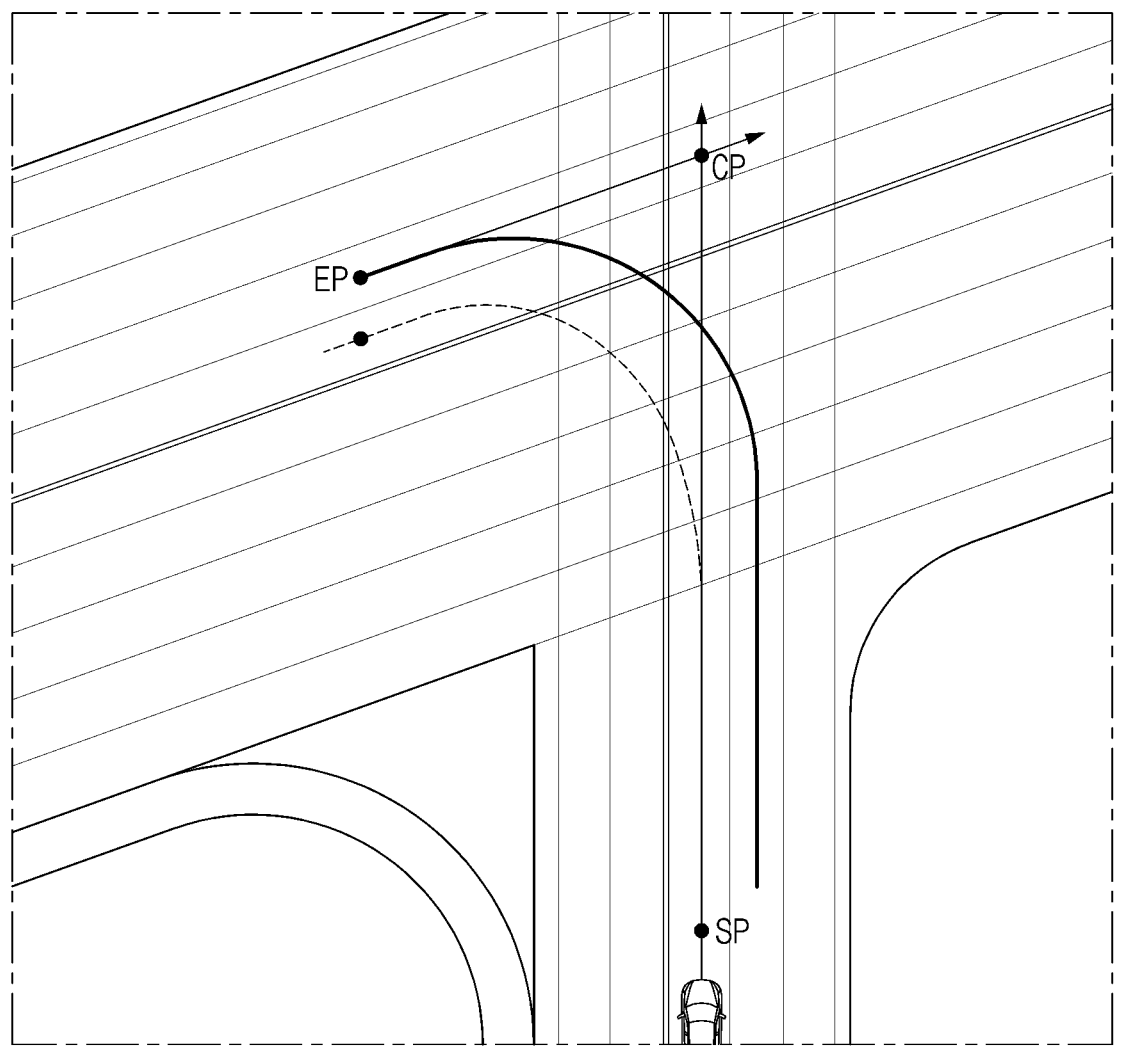
Figure 8:
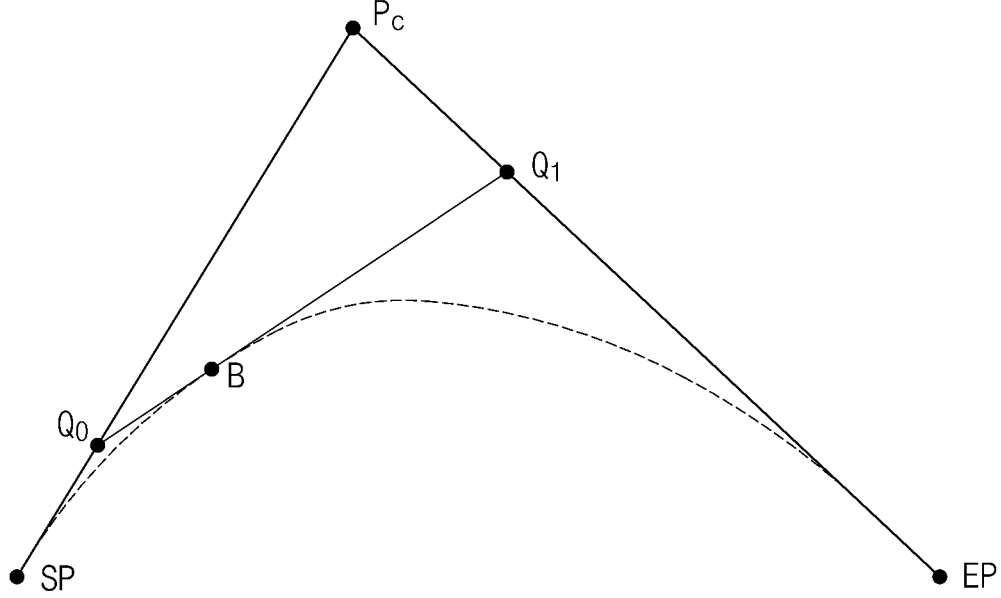
Figure 9:
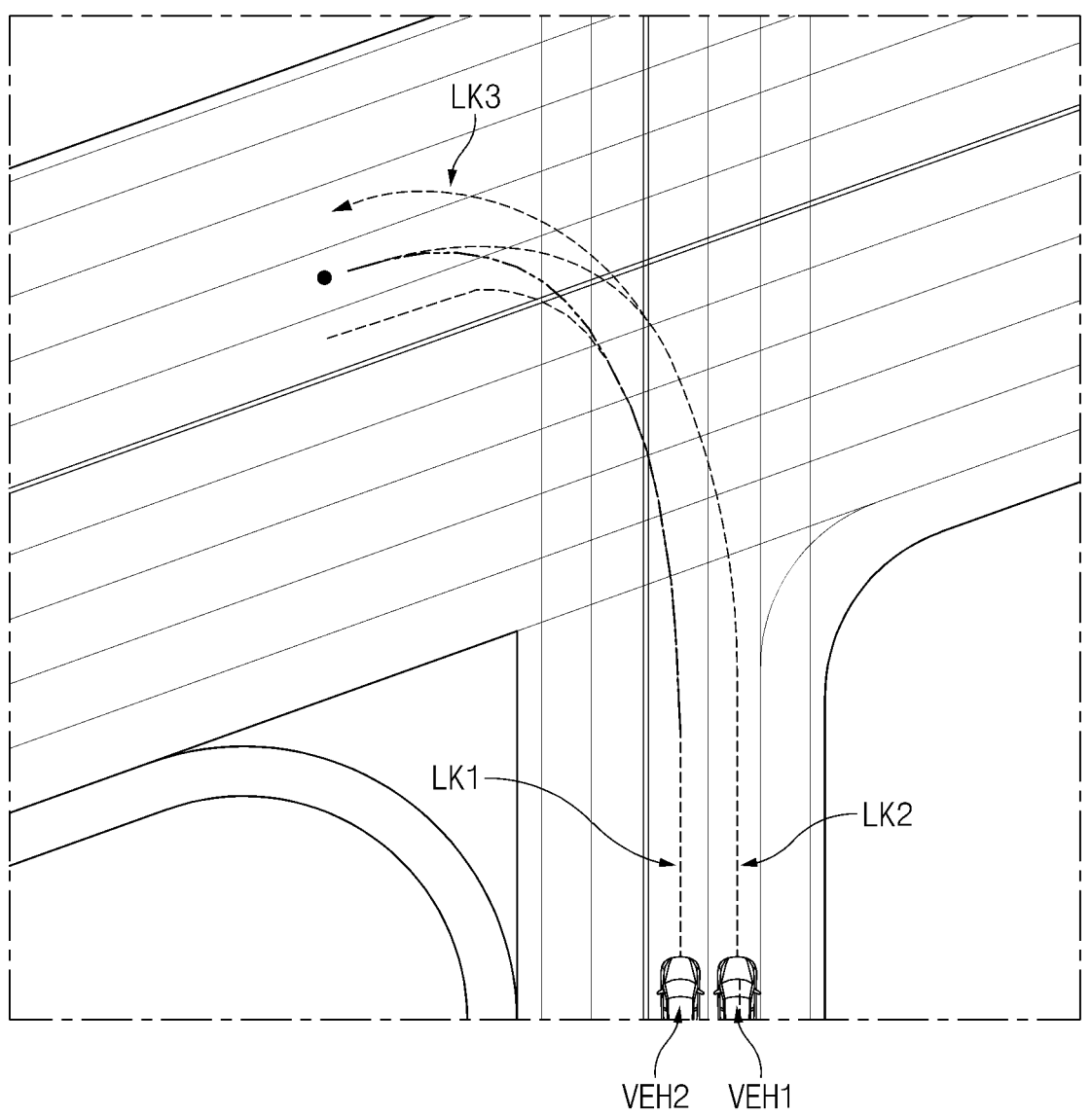
Figure 10:
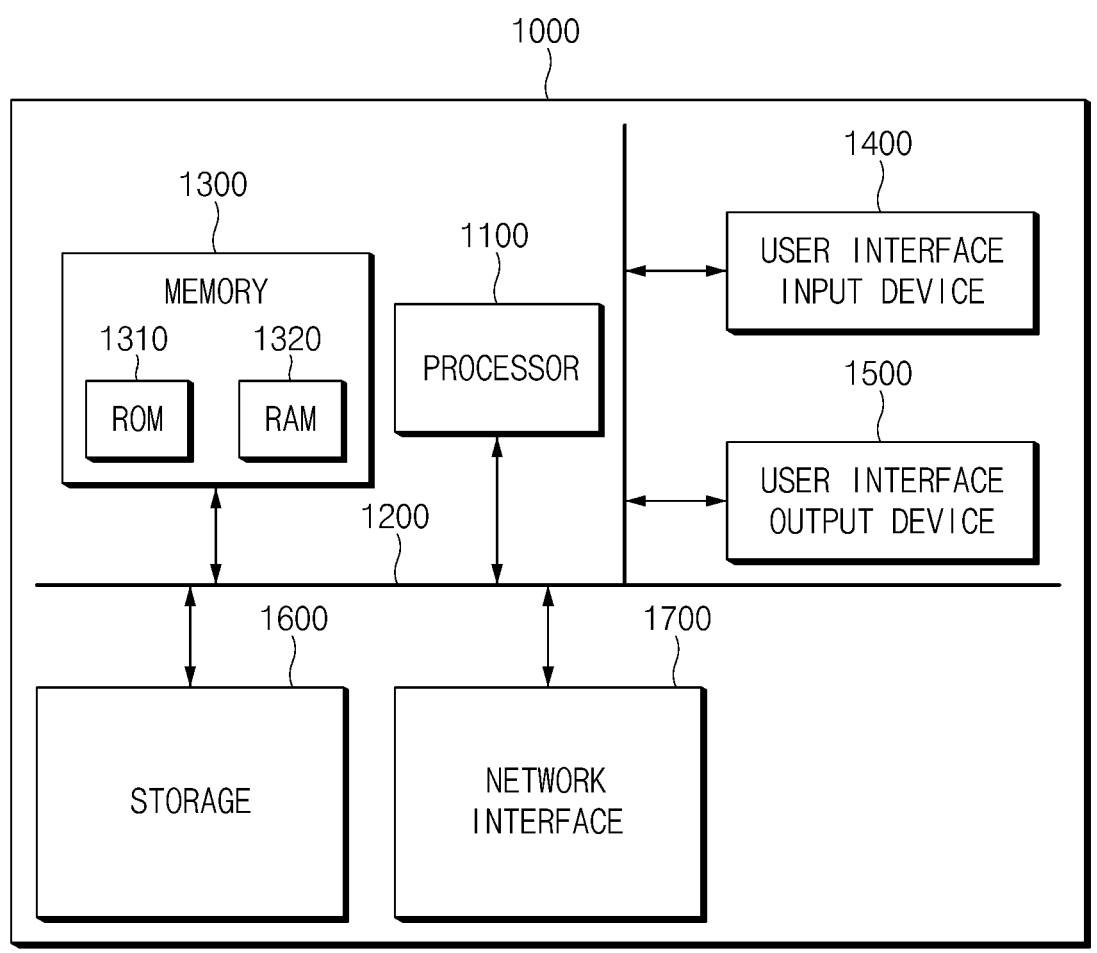

FIG. 6 shows an example of an autonomous driving control method according to another example of the present disclosure;

FIGS. 7 and 8 show an example of a method for changing a driving route according to another example of the present disclosure; and FIG. 9 shows an example of an autonomous driving control method according to another example of the present disclosure; and FIG. 10 shows an example of a computing system according to an example of the present disclosure.

DETAILED DESCRIPTION

Hereinafter, some examples of the present disclosure will be described in detail with reference to the exemplary drawings. In adding the reference numerals to the components of each drawing, it should be noted that the identical or equivalent component is designated by the identical numeral even if they are displayed on other drawings. Further, in describing the example of the present disclosure, a detailed description of the related known configuration or function will be omitted if it is determined that it interferes with the understanding of the example of the present disclosure.

In describing the components of the example according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, examples of the present disclosure will be described in detail with reference to FIGS. 1 to 10.

Figure 1:
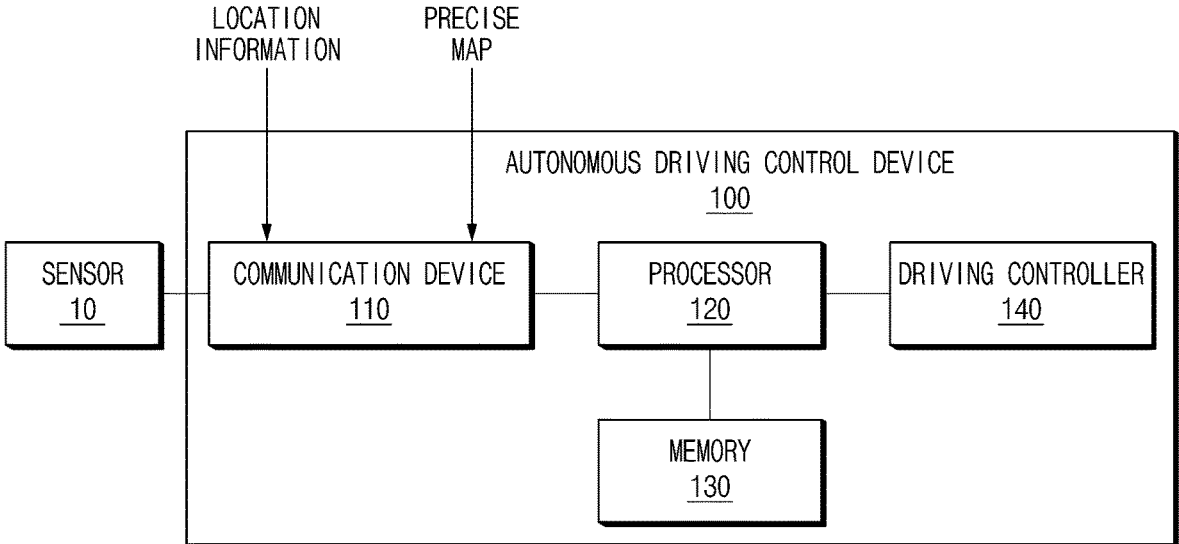
FIG. 1 shows an example of a configuration of a vehicle control device according to an example of the present disclosure.

FIG. 1 shows an example of a configuration of a vehicle control device according to an example of the present disclosure. An autonomous driving control device 100 according to an example of the present disclosure may be implemented inside a vehicle. The autonomous driving control device 100 may be integrally formed with internal control units of the vehicle, or may be implemented as a separate device and connected to the control units of the vehicle by separate connection means.

Referring to FIG. 1, the autonomous driving control device 100 according to an example of the present disclosure may include a communication device 110, a processor 120, a memory 130, and a driving controller 140.

The communication device 110 may receive driving state information of the vehicle and external driving environment information of the vehicle from a sensor 10.

The sensor 10 may include a steering angle sensor, an accelerator position sensor (hereinafter, referred to as APS), a brake pedal sensor (hereinafter, referred to as BPS), a yaw rate sensor, a lateral acceleration sensor, a longitudinal acceleration sensor, a wheel speed sensor, a torque sensor, and the like to acquire the driving state information of the vehicle. In addition or alternative, the sensor 10 may include at least one of a camera, a radio detection and ranging (RADAR), a light imaging detection and ranging (LIDAR), an ultrasonic sensor, or an infrared sensor to acquire the external driving environment information of the vehicle.

The communication device 110 may establish communication with another vehicle or an external server, and may establish communication between controllers in the vehicle.

For example, the communication device 110 may support short-range communication using at least one of Bluetooth, radio frequency identification (RFID), infrared data association (IrDA), ultra wideband (UWB), ZigBee, near field communication (NFC), wireless-fidelity (Wi-Fi), Wi-Fi Direct, and wireless universal serial bus (Wireless USB).

In addition or alternative, the communication device 110 may include a global positioning system (GPS) module or a differential global positioning system (DGPS) module for acquiring location information.

In addition or alternative, the communication device 110 may include a V2X communication module. The V2X communication module may include an RF circuit for a protocol of wireless communication with a server (vehicle to infra; V2I), another vehicle (vehicle to vehicle; V2V), or a pedestrian (vehicle to pedestrian; V2P).

The communication device 110 may transmit and receive wireless signals with at least one of a base station, an external terminal, and a center on a mobile communication network built based on technical standards or communication schemes for mobile communication. For example, the communication device 110 may establish communication based on global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), and long term evolution-advanced (LTE-A).

The memory 130 may store an algorithm for implementing specific procedures and may store an AI processor for artificial intelligence learning. The memory 130 may use a hard disk drive, a flash memory, an electrically erasable programmable read-only memory (EEPROM), a static RAM (SRAM), a ferro-electric RAM (FRAM), a phase-change RAM (PRAM), a magnetic RAM (MRAM), a dynamic random access memory (DRAM), a synchronous dynamic random access memory (SDRAM), a double data rate-SDRAM (DDR-SDRAM), and the like.

The processor 120 may create a driving route based on a map for guiding autonomous driving. The driving route may be represented as a lane link that one-on-one matches a line.

In addition or alternative, the processor 120 may detect a curved section based on a change in a heading angle of the driving route. If the driving route is represented as the lane link, the curved section may be detected based on the change in the heading angle of the lane link. The curved section may refer to a section having a curvature equal to or greater than a predetermined critical value. Accordingly, the processor 120 may detect the section having the curvature equal to or greater than the critical value as the curved section.

In addition or alternative, the processor 120 may create a changed driving route by changing the driving route to reduce an amount of change in the heading angle in the curved section. The changed driving route may be selecting a different lane link from a road link to which the driving lane link belongs. The road link may refer to a route of a road unit including a plurality of lines. Therefore, changing the lane link within the road link may mean a lane change.

In addition or alternative, the processor 120 may perform the autonomous driving based on the changed driving route. Because the changed driving route is the route with the reduced amount of change in the heading angle, a passenger may become more comfortable.

The driving controller 140, which is for varying a speed of the vehicle in response to a control signal from the processor 120, may include a steering controller, an engine controller, a braking controller, and a shift controller.

The steering controller may be classified into a hydraulic power steering (HPS) system that controls steering using a hydraulic pressure generated by a hydraulic pump and a motor driven power steering system (hereinafter, referred to as 'MDPS') that controls the steering using an output torque of an electric motor.

The engine controller is an actuator that controls an engine of the vehicle and controls acceleration of the vehicle. The engine controller may be implemented as an engine management system (EMS). The engine controller controls a driving torque of the engine based on accelerator pedal position information output from the accelerator position sensor. The engine controller controls engine output to follow a travel speed of the vehicle requested from the processor 120 during the autonomous driving.

The braking controller, as an actuator that controls deceleration of the vehicle, may be implemented as an electronic stability control (ESC). The braking controller controls a braking pressure to follow a target speed requested from the processor 120. That is, the brake controller controls the deceleration of the vehicle.

The shift controller, as an actuator for controlling a transmission of the vehicle, may be implemented as a shift by wire (SBW). The shift controller controls shift of the vehicle based on a gear position and a gear state range.

Figure 2:
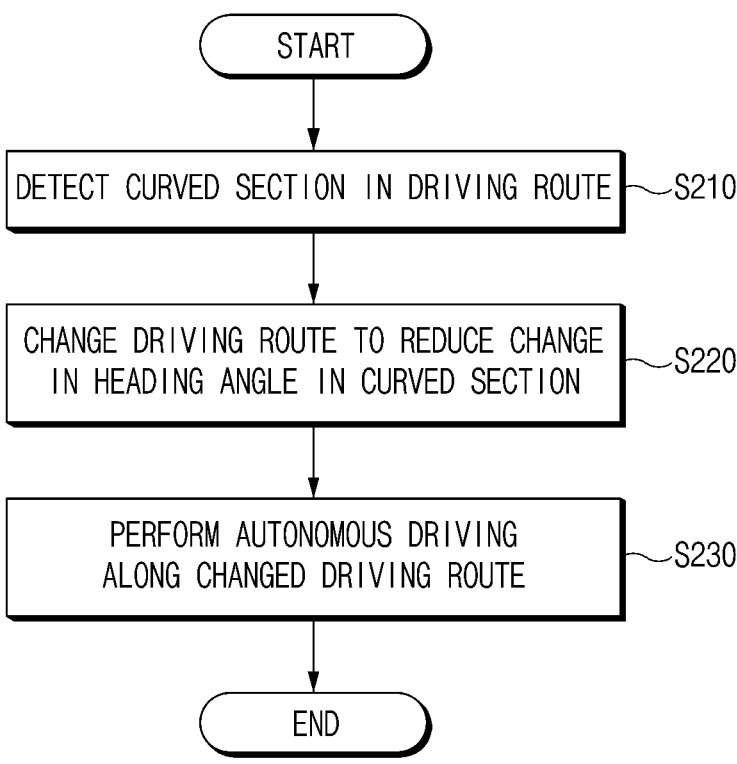
FIG. 2 shows an example of an autonomous driving control method according to an example of the present disclosure.
Figure 3:
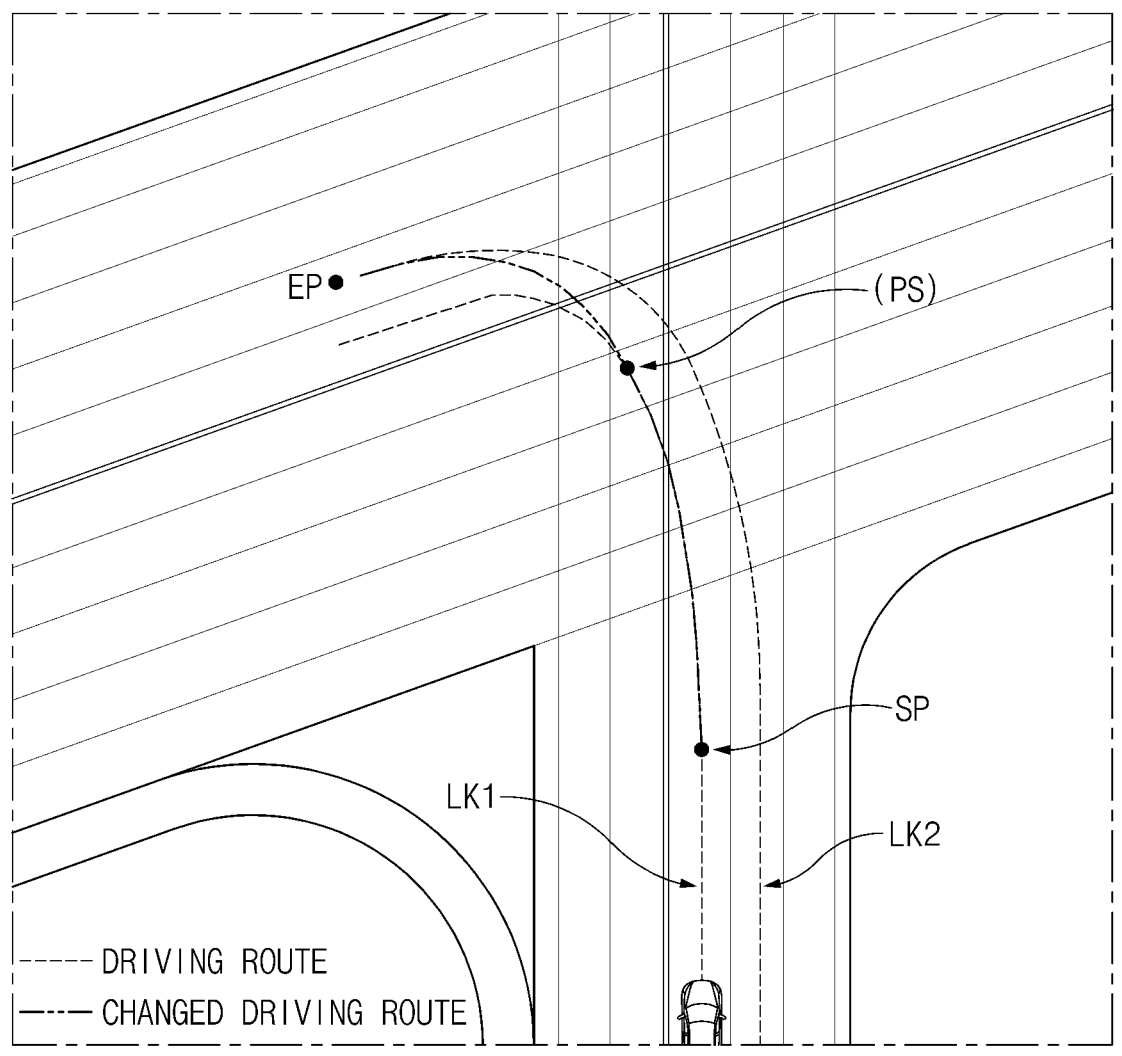
FIG. 3 shows an example of a method for changing a driving route according to an example of the present disclosure.

FIG. 2 shows an example of an autonomous driving control method according to an example of the present disclosure, and FIG. 3 shows an example of a method for changing a driving route according to an example of the present disclosure.

Procedures in FIG. 2 may be controlled by the processor shown in FIG. 1. Hereinafter, based on FIGS. 2 and 3, the autonomous driving control method according to an example of the present disclosure will be described in more detail as follows.

In S210, the processor 120 may create the driving route based on the map for guiding the autonomous driving, and detect the curved section based on the amount of change in the heading angle of the driving route.

The driving route may be the driving lane link selected among a plurality of lane links, and may be determined based on a line where the vehicle is located. For example, as shown in FIG. 3, if the vehicle traveling on a first lane makes a left turn at an intersection, the driving lane link may be determined to maintain the first lane even after the left turn.

The curved section may mean a section in which a curvature of the driving lane link is equal to or greater than the predetermined critical value, and may be detected based on the amount of change in the heading angle of the driving lane link. For example, the processor 120 may determine a point at which the amount of change in the heading angle of the driving lane link is equal to or greater than a first critical angle as a start point SP of the curved section, and determine a point at which the amount of change in the heading angle after the start point is equal to or smaller than a second critical angle as an end point EP of the curved section.

In S220, the processor 120 may create the changed driving route by changing the driving route to reduce the change in the heading angle.

For example, as shown in FIG. 3, the processor 120 may connect a driving lane link LK1 connecting the first lanes to each other to a lane link LK2 connecting second lanes to each other after passing through the intersection. That is, the driving lane link LK1 remains unconnected to the second lane while the vehicle is traveling on the first lane, but the processor 120 may change the driving lane link to make the curvature of the curved section smaller.

To this end, the processor 120 may detect a maximum change point Ps in the curved section and change the driving route to make a curvature change at the maximum change point Ps gentler.

In S230, the processor 120 may perform the autonomous driving along the changed driving route. To this end, the processor 120 may control the driving controller 140.

Because a curvature of a curve of the changed driving lane link is reduced, an amount of change in lateral acceleration in a process in which the vehicle turns may be reduced, and the passenger may become more comfortable.

Hereinafter, a detailed example of each of the procedures shown in FIG. 2 is as follows.

Figure 4:
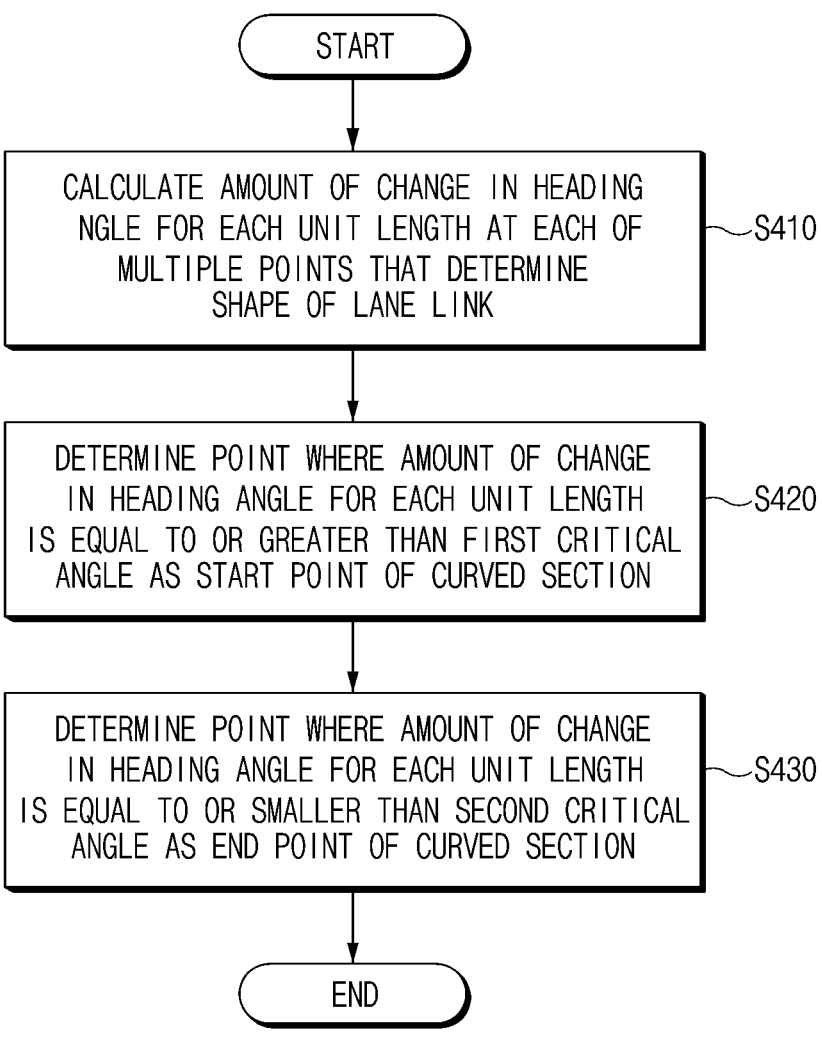
FIG. 4 shows an example of detecting a curved section according to an example of the present disclosure.
Figure 5:
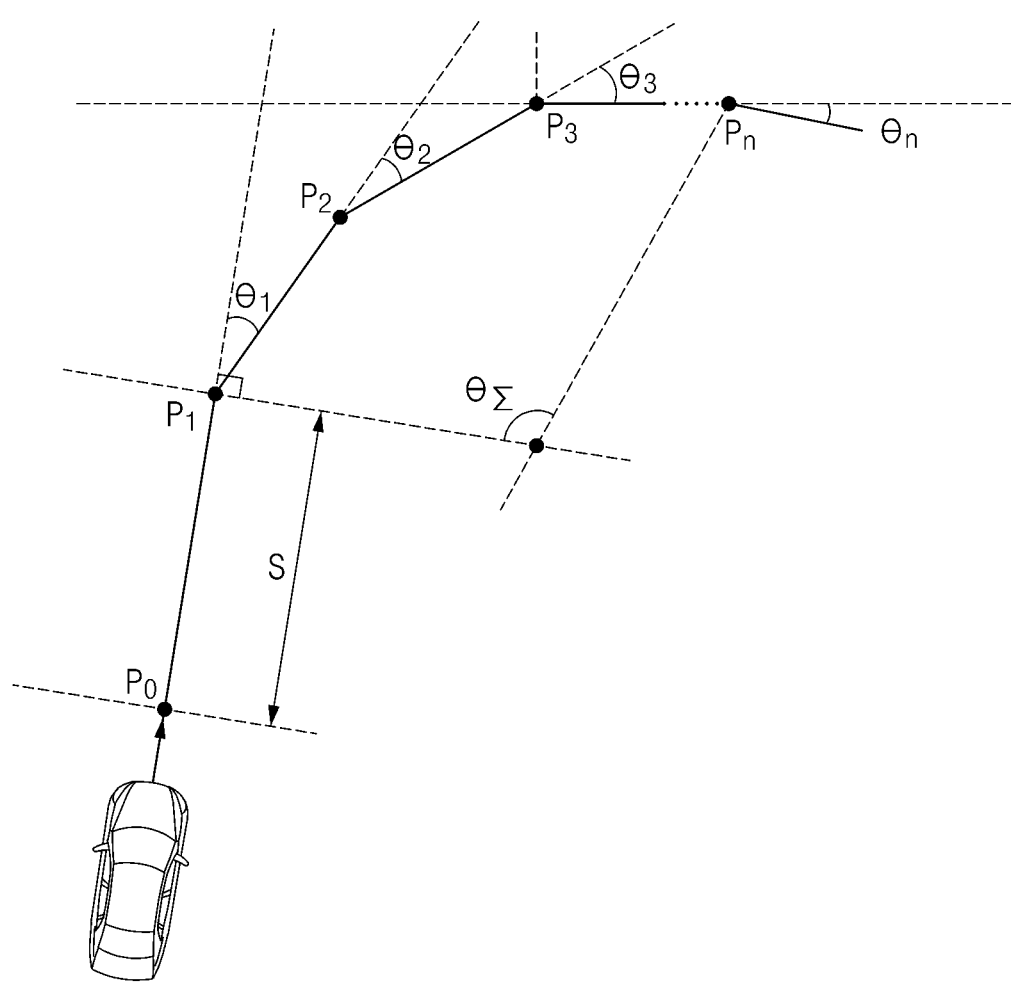
FIG. 5 shows an example of detecting a curved section shown in FIG. 4.

FIG. 4 shows an example of detecting a curved section according to an example of the present disclosure, and FIG. 5 shows an example of detecting a curved section shown in FIG. 4.

Referring to FIGS. 4 and 5, an example of detecting a curved section according to an example of the present disclosure is as follows.

In S410, the processor 120 may calculate an amount of change in the heading angle for each unit length at each of multiple points that determine a shape of the driving lane link.

The amount of change in the heading angle for each unit length may be a result of dividing the amount of change in the heading angle by a spacing between the points.

To calculate the amount of change in the heading angle for each unit length at each of the points, the processor 120 may calculate amount of changes in the heading angle at the points. As shown in FIG. 5, an amount of change in the heading angle of Pi (i is a natural number equal to or smaller than n) among points P0 to Pn (n is a natural number equal to or greater than 2) may be defined as an interior angle between a straight line that connects the point Pi with the point P(i−1) and a straight line that connects the point Pi with the point P(i+1). For example, an amount of change in the heading angle at the point P1 means an interior angle between a straight line that connects the point P1 with the point P0 and a straight line that connects the point P1 with the point P2, and may be "θ1".

As shown in FIG. 5, the points P0 to Pn may mean feature points for representing shapes of the lane links. Therefore, the points may be widely arranged in a section where an amount of change of the lane link is small, and may be narrowly arranged in a section where the amount of change of the lane link is great, such as a sharp curve section. For example, in FIG. 5, a spacing between the point P0 and the point P1 located in a straight section may be set greater than a spacing between the point P1 and the point P2 located in a curved section.

A point spacing at the point Pi may mean a distance between the Pi and the P(i+1). For example, the point spacing at the point P1 may be a distance between the point P2 and the point P1.

As a result, an amount of change in the heading angle for each unit length at the point P1 may be a magnitude of "θ1" divided by "unit length L1".

In S420, the processor 120 may determine a point where the amount of change in the heading angle for each unit length is equal to or greater than the first critical angle as a start point of the curved section.

For example, as shown in FIG. 5, if the magnitude of "θ1/L1" is equal to or greater than the predetermined first critical angle, the point Pi may be determined as a start point.

In S430, the processor 120 may determine a point where the amount of change in the heading angle for each unit length is equal to or smaller than the second critical angle as an end point of the curved section.

For example, as shown in FIG. 5, if a magnitude obtained by dividing "θn" by a point spacing at the point Pn is equal to or smaller than the predetermined second critical angle, the point Pn may be determined as the end point.

Accordingly, the processor 120 may determine a section from the point P1 to the point Pn as the curved section.

In addition or alternative, the processor 120 may detect the maximum change point Ps based on the change in the heading angle of the lane link. Specifically, the processor 120 may determine a point having the greatest amount of change in the heading angle for each unit length as the maximum change point. A change rate of the amount of change in the heading angle for each unit length at the point Pi may be calculated by subtracting an amount of change in the heading angle for each unit length at the point P(i−1) from the amount of change in the heading angle for each unit length at the point Pi. For example, a change rate of the amount of change in the heading angle for each unit length at the point P2 may be obtained by subtracting the amount of change in the heading angle for each unit length at the point P1 from the amount of change in the heading angle for each unit length at the point P2, and may be calculated as "θ2−θ1".

As described in FIG. 3, the processor 120 may create a changed driving link by connecting the driving lane link with a new lane link at the maximum change point Ps.

The new lane link may be determined based on an average amount of change in the heading angle.

For example, the processor 120 may calculate an average amount of change in the heading angle for each unit length from the start point to the maximum change point. In addition or alternative, the processor 120 may modify the shape of the driving lane link such that a change rate of the heading angle for each unit length at the maximum change point becomes the average amount of change in the heading angle. The processor 120 may change the driving lane link such that a lane link having a shape closest to the modified shape of the driving lane link at the end point is connected to the maximum change point.

For example, FIG. 3 shows the example connected to the new lane link connecting the second lanes to each other. The vehicle may perform the autonomous driving along the second lane after passing through the intersection.

Alternatively or additionally, the processor 120 may change the driving lane link based on a radius of curvature. A radius of curvature at the point Pi may mean a radius of curvature of a circle having a shape closest to a shape of a curve connecting the point Pi to the point Pn. For example, if a center of a circle having a shape closest to that of the curved section is referred to as "ZO", a length of an arc of the curved section may mean a length from P1 to Pn. In addition or alternative, an interior angle of the arc may mean a sum of the amounts of change in the heading angle from the point P1 to the point Pn. Therefore, a radius of the circle corresponding to the radius of curvature may be calculated using a relational expression between a circumference of the circle and the arc of the circle.

The processor 120 may create a shape of the driving lane link at the maximum change point Ps as an arc equal to an arc having a radius of curvature from the point P1 to the maximum change point Ps, and determine a lane link closest to the created arc as the new lane link.

FIG. 6 shows an example of an autonomous driving control method according to another example of the present disclosure. Procedures shown in FIG. 6 may be controlled by the processor shown in FIG. 1. Hereinafter, referring to FIG. 6, the autonomous driving control method according to another example of the present disclosure will be described as follows.

In S601, the processor 120 may calculate whether a distance from a point where the straight section is entered after turning left or right to the destination is smaller than a predetermined critical distance.

The point where the straight section is entered may be determined based on the amount of change in the heading angle of the driving lane link.

Step S601 may be a step of determining whether the destination is close after passing through the intersection or the curved section.

In S602, the processor 120 may determine whether there are a plurality of driving lanes after turning left or right.

In S603, the processor 120 may determine whether the driving route corresponds to an outermost lane after turning left or turning right.

In S604, the processor 120 may change the driving route. For example, the processor 120 may change the driving route to a lane connected to the outermost lane of the road during the left turn or the right turn.

Via steps S601 to S604, the processor 120 may correct an expected driving route if the distance to the destination after the left turn or the right turn is smaller than the critical distance and the vehicle is traveling in a lane other than the outermost lane among the plurality of lanes.

In a state in which the destination is close after passing through the intersection or passing through the curved section, the lane change may be urgently requested to move to the outermost lane to stop at the destination.

The example shown in FIG. 6 may change the driving route to the outermost lane at the intersection or the curved section close to the destination, thereby preventing an abrupt lane change attempt after passing through the intersection.

If it is determined in step S601 that the distance to the destination after passing through the intersection or the curved section is equal to or greater than the critical distance, the driving route may be maintained via step S605.

In addition or alternative, if it is determined in step S602 that there is only one lane connected to the intersection or the curved section, or if the driving lane is the outermost lane in step S603, the driving route may be maintained via step S605.

FIGS. 7 and 8 show an example of a method for changing a driving route according to another example of the present disclosure.

FIGS. 7 and 8 illustrate an example of presetting a new lane link for the lane change and connecting the driving lane link and the new lane link to each other.

The new lane link may be preset in consideration of the number of driving lanes or vehicles traveling in other lanes. For example, if a lane of the curved section is the second lane and the driving lane is the first lane, the driving lane change may be limited to the second lane. Alternatively or additionally, even if the curved section has three or more lanes, the driving lane change may be limited to one lane change to suppress a change of two or more lines at the intersection.

As shown in FIG. 7, if the driving lane link is the first lane and the new lane link is the second lane, the processor 120 may determine the start point SP in the driving lane link. The start point SP may mean a start point of the curved section in the driving lane link, and may be determined based on the example described with reference to FIGS. 4 and 5.

In addition or alternative, the processor 120 may determine the end point EP in the new lane link. The end point EP may mean an end point of a curved section in the new lane link, and may be determined based on the example described with reference to FIGS. 4 and 5. Alternatively or additionally, the end point may be arbitrarily determined at a point after passing through the intersection regardless of whether the curved section is detected in the new lane link.

As shown in FIG. 8, the processor 120 may connect the driving lane link with the new lane link in a form of a Bézier curve that connects the start point of the driving lane link with the end point of the new lane link. The processor 120 may determine a control point CP to determine the Bézier curve. The control point CP may be determined as an intersecting point of a straight line extending the straight section of the driving lane link before entering the intersection and a straight line extending a straight section of the new lane link after passing through the intersection.

The processor 120 may set Q0 passing through the start point SP and the control point CP at a constant speed. Similarly, Q1 passing through the control point CP and the end point EP at a constant speed may be set. A movement trace of a point B moving at a constant speed from the Q0 to the Q1 on a straight line connecting the Q0 with the Q1 may become a curve connecting the P1 to the Pn, and the curve representing a trajectory of the point B may mean the Bézier curve.

FIG. 9 is a diagram for illustrating an autonomous driving control method according to another example of the present disclosure. In FIG. 9, a vehicle that is a subject of the autonomous driving control method may mean a vehicle traveling in a second lane. In a description of the example of FIG. 9, the processor 120 may mean a processor of a vehicle VHE1 traveling in the second lane. In FIG. 9, a first lane link LK1 may mean a lane link that connects a first lane before an intersection with a first lane after a left turn, and may mean a lane link in which another vehicle VHE2 is driving. The second lane link LK2 may mean a lane link that connects a second lane before the intersection with a second lane after the left turn, and may mean a lane link in which the vehicle VHE1 is traveling. A third lane link LK3 may mean a third lane after the left turn.

Referring to FIG. 9, the autonomous driving control method according to another example of the present disclosure will be described as follows.

The processor 120 of the vehicle VHE1 traveling in the second lane may detect a curved section of another vehicle VHE2 located in an inner lane before entering the intersection.

The processor 120 may sense the curved section in the lane link LK1 in which another vehicle VHE2 is traveling. When sensing the curved section in the driving lane link LK1 in which another vehicle VHE2 is traveling, the processor 120 may predict that another vehicle VHE2 will change the driving lane link from the lane link LK1 to the lane link LK2.

When predicting that another vehicle VHE2 will change the lane link, the processor 120 may determine whether there is a lane outwardly of the vehicle VHE1. As shown in FIG. 9, if there is the third lane outwardly of the vehicle VHE1, the processor 120 may connect the lane link LK2 in which the vehicle VHE1 is traveling to the lane link LK3. If it is predicted that the inner vehicle VHE2 will change the driving lane link as such, the processor 120 may change the driving lane link even if the curved section is not sensed in the driving lane link of the vehicle VHE1. Accordingly, the autonomous driving may be performed by considering a ride comfort of a passenger of another vehicle VHE2.

FIG. 10 shows an example of a computing system according to an example of the present disclosure.

With reference to FIG. 10, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the examples disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The present disclosure has been made to solve the above-mentioned problems occurring in the prior art while advantages achieved by the prior art are maintained intact.

An example of the present disclosure provides a device and a method for controlling autonomous driving that may improve a ride comfort of a passenger.

Another example of the present disclosure provides a device and a method for controlling autonomous driving for preventing a situation in which a lane change is abruptly attempted.

The technical problems to be solved by the present disclosure are not limited to the aforementioned problems, and any other technical problems not mentioned herein will be clearly understood from the following description by those skilled in the art to which the present disclosure pertains.

According to an example of the present disclosure, a device for controlling autonomous driving includes a memory that stores autonomous driving route setting algorithm, and a processor that sets an autonomous driving route by executing the algorithm. The processor creates a driving route based on a map, detects a curved section based on an amount of change in a heading angle of the driving route, and changes the driving route to reduce a change in the heading angle in the curved section.

In one implementation, the processor may determine a driving lane link by selecting one of a plurality of lane links one-on-one matching lines based on a location of a vehicle.

In one implementation, the processor may select a new lane link among outer lane links of the driving lane link, and connect the selected new lane link with the driving lane link.

In one implementation, the processor may calculate an amount of change in the heading angle for each unit length at each of a plurality of points determining a shape of the driving lane link, detect a start point having an amount of change in the heading angle for each unit length equal to or greater than a first critical angle among the points, detect an end point having an amount of change in the heading angle for each unit length equal to or smaller than a second critical angle among the points after the start point, and determine a section between the start point and the end point as the curved section.

In one implementation, the processor may calculate a change rate of the amount of change in the heading angle for each unit length at each of the points, and change the driving route by connecting the driving lane link with a new lane link at a maximum change point with the greatest change rate of the amount of change in the heading angle for each unit length.

In one implementation, the processor may obtain an average amount of change in the heading angle by calculating an average amount of change in the heading angle for each unit length from the start point to the maximum change point, correct the driving lane link such that an amount of change in the heading angle for each unit length at the maximum change point becomes a magnitude of the average amount of change in the heading angle, and change the driving route by connecting a lane link closest to the corrected driving lane link with the maximum change point.

In one implementation, the processor may change the driving lane link into a Bézier curve shape connecting a start point of the curved section in the driving lane link with an end point of a curved section in the new lane link.

In one implementation, the processor may determine a section of the driving lane link from a point entering an intersection to a destination as the curved section if a distance from a point entering a straight section to the destination is equal to or smaller than a critical distance after passing through the intersection.

In one implementation, the processor may change the driving lane link within the intersection to enter a line closest to the destination.

In one implementation, the processor may detect an adjacent curved section of a line adjacent to the driving route, and change the driving route in an opposite direction of the adjacent curved section in the adjacent curved section.

According to another example of the present disclosure, a method for controlling autonomous driving includes creating a driving route based on a map for guiding the autonomous driving, and detecting a curved section based on an amount of change in a heading angle of the driving route, creating a changed driving route by changing the driving route to reduce a change in the heading angle in the curved section, and performing the autonomous driving along the changed driving route.

In one implementation, the creating of the driving route may include determining a driving lane link by selecting one of a plurality of lane links one-on-one matching lines based on a location of a vehicle.

In one implementation, the creating of the changed driving route may include selecting a new lane link among outer lane links of the driving lane link, and connecting the selected new lane link with the driving lane link.

In one implementation, the detecting of the curved section may include calculating an amount of change in the heading angle for each unit length at each of a plurality of points determining a shape of the driving lane link, detecting a start point having an amount of change in the heading angle for each unit length equal to or greater than a first critical angle among the points, detecting an end point having an amount of change in the heading angle for each unit length equal to or smaller than a second critical angle among the points after the start point, and determining a section between the start point and the end point as the curved section.

In one implementation, the creating of the changed driving route may include calculating a change rate of the amount of change in the heading angle for each unit length at each of the points, and connecting the driving lane link with a new lane link at a maximum change point with the greatest change rate of the amount of change in the heading angle for each unit length.

In one implementation, the creating of the changed driving route may include obtaining an average amount of change in the heading angle by calculating an average amount of change in the heading angle for each unit length from the start point to the maximum change point, and correcting the driving lane link such that an amount of change in the heading angle for each unit length at the maximum change point becomes a magnitude of the average amount of change in the heading angle, and connecting a lane link closest to the corrected driving lane link with the maximum change point.

In one implementation, the creating of the changed driving route may include changing the driving lane link into a Bézier curve shape connecting a start point of the curved section in the driving lane link with an end point of a curved section in the new lane link.

In one implementation, the detecting of the curved section may include determining a section of the driving lane link from a point entering an intersection to a destination as the curved section if a distance from a point entering a straight section to the destination is equal to or smaller than a critical distance after passing through the intersection.

In one implementation, the creating of the changed driving route may include changing the driving lane link within the intersection to enter a line closest to the destination.

In one implementation, the method may further include detecting an adjacent curved section of a line adjacent to the driving route, and changing the driving route in an opposite direction of the adjacent curved section in the adjacent curved section.

The description above is merely illustrative of the technical idea of the present disclosure, and various modifications and changes may be made by those skilled in the art without departing from the essential characteristics of the present disclosure.

Therefore, the examples disclosed in the present disclosure are not intended to limit the technical idea of the present disclosure but to illustrate the present disclosure, and the scope of the technical idea of the present disclosure is not limited by the examples. The scope of the present disclosure should be construed as being covered by the scope of the appended claims, and all technical ideas falling within the scope of the claims should be construed as being included in the scope of the present disclosure.

According to the example of the present disclosure, the vehicle may travel along the driving route in which the curvature of the curved section is set to be gentler, so that the ride comfort of the passenger may be improved.

In addition or alternative, according to the example of the present disclosure, if the destination is near after passing through the intersection, the driving route that makes the vehicle easily stop at the destination may be selected at the intersection, so that the abrupt lane change immediately after passing through the intersection may be prevented.

In addition or alternative, various effects identified directly or indirectly through the present document may be provided.

Hereinabove, although the present disclosure has been described with reference to examples and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for controlling autonomous driving, the device comprising:
    a processor; and
    a memory storing instructions, if executed by the processor, cause the device to:
        create a driving route based on a map;
        determine, based on an amount of change in a heading angle of the driving route, a curved section;
        change the driving route to reduce the amount of change in the heading angle; and
        control autonomous driving of a vehicle along the changed driving route,
        wherein the curved section includes a start point and an end point, and
        wherein an amount of change in the heading angle for each unit length at the end point is equal to or smaller than a first critical angle.

2. The device of claim 1, wherein the instructions, if executed by the processor, cause the device to select a driving lane link of a plurality of lane links, wherein each driving lane link matches, based on a location of the vehicle, one-on-one with a corresponding lane.

3. The device of claim 2, wherein the instructions, if executed by the processor, cause the device to:
    select a new lane link among outer lane links of the driving lane link; and
    connect the selected new lane link with the driving lane link,
    wherein a lane of the driving route associated with a lane link at the end point is different from a lane of the changed driving route associated with the selected new lane link.

4. The device of claim 3, wherein the instructions, if executed by the processor, cause the device to change the driving lane link into a Bézier curve shape connecting a start point of a curved section in the driving lane link with an end point of a curved section in the selected new lane link.

5. The device of claim 2, wherein the instructions, if executed by the processor, cause the device to:
    calculate the amount of change in the heading angle for each unit length at each of a plurality of points along the driving lane link; and
    detect the start point having the amount of change in the heading angle for each unit length equal to or greater than a second critical angle among the plurality of points.

6. The device of claim 5, wherein the instructions, if executed by the processor, cause the device to:

calculate a change rate of the amount of change in the heading angle for each unit length at each of the plurality of points; and change the driving route by connecting the driving lane link with a new lane link at a change point with the greatest change rate of the amount of change in the heading angle for each unit length.

7. The device of claim 6, wherein the instructions, if executed by the processor, cause the device to:

calculate an average amount of change in the heading angle for each unit length from the start point to the change point;

adjust the driving lane link such that the amount of change in the heading angle for each unit length at the change point becomes a magnitude of the average amount of change in the heading angle; and change the driving route by connecting a driving lane link closest to the adjusted driving lane link with the change point.

8. The device of claim 2, wherein the instructions, if executed by the processor, cause the device to:

determine that a distance from a point entering a straight section to a destination is equal to or smaller than a critical distance after passing through an intersection; and based on the distance from the point entering the straight section to the destination being equal to or smaller than the critical distance, determine a section, of the driving lane link from a point entering the intersection to the destination, as the curved section.

9. The device of claim 8, wherein the instructions, if executed by the processor, cause the device to change the driving lane link within the intersection to enter a lane closest to the destination.

10. The device of claim 2, wherein the instructions, if executed by the processor, cause the device to:

detect an adjacent curved section of a lane adjacent to the driving route; and change the driving route in an opposite direction of where the adjacent curved section is located.

11. A method for controlling autonomous driving, the method comprising:

creating, by a processor, a driving route based on a map for guiding the autonomous driving, and determining, based on an amount of change in a heading angle of the driving route, a curved section;

changing the driving route to reduce the amount of change in the heading angle; and controlling autonomous driving of a vehicle along the changed driving route, wherein the curved section includes a start point and an end point, and wherein an amount of change in the heading angle for each unit length at the end point is equal to or smaller than a first critical angle.

12. The method of claim 11, wherein the creating the driving route includes:

selecting a driving lane link of a plurality of lane links, wherein each driving lane link matches, based on a location of the vehicle, one-on-one with line corresponding lane.

13. The method of claim 12, wherein the changing the driving route includes:

selecting a new lane link among outer lane links of the driving lane link; and connecting the selected new lane link with the driving lane link, wherein a lane of the driving route associated with a lane link at the end point is different from a lane of the changed driving route associated with the selected new lane link.

14. The method of claim 13, wherein the changing the driving route includes:

changing the driving lane link into a Bézier curve shape connecting a start point of a curved section in the driving lane link with an end point of a curved section in the selected new lane link.

15. The method of claim 12, wherein the determining the curved section includes:

calculating the amount of change in the heading angle for each unit length at each of a plurality of points determining a shape of the driving lane link; and detecting the start point having the amount of change in the heading angle for each unit length equal to or greater than a second critical angle among the plurality of points.

16. The method of claim 15, wherein the changing the driving route includes:

calculating a change rate of the amount of change in the heading angle for each unit length at each of the plurality of points; and connecting the driving lane link with a new lane link at a change point with the greatest change rate of the amount of change in the heading angle for each unit length.

17. The method of claim 16, wherein the changing the driving route includes:

calculating an average amount of change in the heading angle for each unit length from the start point to the change point; and adjusting the driving lane link such that the amount of change in the heading angle for each unit length at the change point becomes a magnitude of the average amount of change in the heading angle; and connecting a driving lane link closest to the adjusted driving lane link with the change point.

18. The method of claim 12, wherein the determining the curved section includes:

determining that a distance from a point entering a straight section to a destination is equal to or smaller than a critical distance after passing through an intersection; and based on the determining, determining a section, of the driving lane link from a point entering the intersection to the destination, as the curved section.

19. The method of claim 18, wherein the changing the driving route includes:

changing the driving lane link within the intersection to enter a lane closest to the destination.

20. The method of claim 12, further comprising:

detecting an adjacent curved section of a lane adjacent to the driving route; and changing the driving route in an opposite direction of where the adjacent curved section is located.

* * * * *